United States Patent [19]
Williamson et al.

[11] Patent Number: 5,215,688
[45] Date of Patent: Jun. 1, 1993

[54] APPARATUS AND METHOD FOR AERODYNAMIC LEVITATION

[75] Inventors: John W. Williamson; Mohamad M. al-Darwish, both of Nashville, Tenn.; Grant E. Cashen, Montrose, Colo.

[73] Assignee: Vanderbilt University, Nashville, Tenn.

[21] Appl. No.: 685,228

[22] Filed: Apr. 12, 1991

[51] Int. Cl.⁵ .............................................. B29B 9/10
[52] U.S. Cl. ........................................ 264/14; 264/12; 264/13
[58] Field of Search ............... 264/12, 13, 14; 432/11, 432/14, 58, 227; 62/57

[56] References Cited

U.S. PATENT DOCUMENTS

| | | |
|---|---|---|
| 4,366,065 | 12/1982 | Leslie et al. |
| 4,378,209 | 3/1983 | Berge et al. .................. 432/58 |
| 4,523,682 | 6/1985 | Barmatz et al. |
| 4,565,557 | 1/1986 | Naumann et al. |
| 4,654,065 | 3/1987 | Naumann et al. |
| 4,677,642 | 6/1987 | Robinson et al. |
| 4,841,772 | 6/1989 | Paik. |
| 4,929,400 | 5/1990 | Rembaum et al. |
| 4,951,472 | 8/1990 | Hansen et al. |
| 4,966,737 | 10/1990 | Werner et al. .................. 264/12 |
| 4,981,625 | 1/1991 | Rhim et al. |

OTHER PUBLICATIONS

Krispin, Williamson and Strauss, "Jet Levitation of Spherical Shapes for Microgravity Research", 38th Congress of Int'l Astro. Fed. 1987.

Barmatz, "Overview of Containerless Processing Technologies", Materials Processing in the Reduced Gravity Environment of Space, 1982, Elsevier Publishing Co., Inc.

*Primary Examiner*—Henry C. Yuen
*Attorney, Agent, or Firm*—Stephen T. Belsheim

[57] ABSTRACT

An apparatus for the levitation of a liquid drop by a fluid flow comprising a profile generator, a fluid flow supply means operatively connected to the profile generator. The profile generator includes an elongate cylindrical shell in which is contained a profiling means for configuring the velocity profile of the fluid flow exiting the profile generator.

22 Claims, 5 Drawing Sheets

APPARATUS AND METHOD FOR AERODYNAMIC LEVITATION

ORIGIN OF THE INVENTION

The invention described herein was made in the performance of work under a NASA contract, NAGW-810, and is subject to the provisions of Public Law 96-517 (35 USC §202).

BACKGROUND OF THE INVENTION

This invention relates to an apparatus and method for aerodynamic levitation. More specifically, the invention pertains to an apparatus and method for aerodynamic levitation of a liquid drop using a profile generator to configure the velocity profile of the air flow impinging upon the liquid drop.

The invention has application for containerless processing of materials. This is especially true for small size samples such as those for prototype applications.

The invention also has usefulness as an analytical tool to study the properties of liquid materials. One example of such an analytical use is the determination of the thermal conductivity of a molten material.

Although there may be a number of applications for levitation techniques, one principal use of levitation techniques is for containerless processing. This may be due, at least in part, to the availability of orbital space environments where containerless processing can be of advantage.

In space, there exists a reduction of gravitational force which significantly reduces the hydrostatic pressure, buoyant forces, natural convection and sedimentation that occurs in an earth bound environment. Because of its nature, containerless processing can take advantage of such an environment.

However, because a truly zero-gravity environment cannot be completely realized in an orbiting space craft due to accelerations associated with space craft, trajectory alterations, atmospheric drag and movement of astronauts within the vehicle, it is still necessary to spatially localize the material using externally generated forces. Levitation techniques are able to generate these external forces.

These levitation techniques, which are useful for containerless processing, provide the ability to manipulate materials without physical contact with a container. Because of the absence of this contact, containerless processing eliminates container-induced contamination and heterogeneous nucleation.

Some of these techniques have the inherent characteristic to melt and levitate the material at the same time. Oftentimes, this is not a desirable feature because of the advantage of separating the levitation and melting functions.

Containerless processing has been used for the manufacture of ceramics, such as shown and described in U.S. Pat. No. 4,966,737 to Werner et al. entitled "Method And A Device For Manufacturing A Powder Of Amorphous Ceramic Or Metallic Particles". This patent describes the use of an acoustic levitation field acting with an inert cooling gas in the area in front of the nozzle projecting a substance in the liquid state. The inert cooling gas cools the liquid material while in a levitated state.

Levitation techniques have also been utilized to isolate a sample from its surroundings for spectrometric measurements at very high temperatures as shown and described in U.S. Pat. No. 4,958,126 to Brevard et al. entitled "Probe For Magnetic Resonance Spectrometric Measures At Very High Temperatures". This patent concerns a probe for a spectrometer resonator for very high temperatures that uses a laser bean focused on a sample as a means to heat the sample. The sample is levitated in the interior volume of the resonator.

Levitation techniques used to produce products were also shown and described in U.S. Pat. No. 4,929,400 to Rembaum et al. entitled "Production Of Monodisperse Polymetric Microspheres". In this patent larger size microspheres can be produced by the levitation of larger sizes of droplets of polymerizable material during the polymerization by radiation.

U.S. Pat. No. 4,378,209 to Berge et al. shows a gas levitator used in containerless processing. The gas levitator supports the material as the levitator axis is rotated from vertical to horizontal to inverted to vertical. This levitator can be used on earth at any angle of inclination with respect to an earth reference and in space.

As previously mentioned, this invention has application as an analytical tool for low-gravity processes. In the past, persons have tried to study low-gravity processing of materials. The National Aeronautics and Space Administration has utilized various vehicles to study containerless processing. NASA has utilized the KC-135 Air Force cargo plane which achieves a low-G state for 25 seconds by flying a prescribed parabolic trajectory. NASA has also utilized an F-104 aircraft which flies a parabolic trajectory and attains a "free fall" period of about 60 seconds.

Beginning in 1975, NASA conducted space processing applications with the help of the rocket program in order to provide short duration, for example, five to seven minutes, flight opportunities for research in a low-gravity environment.

A convenient and economic device for the study of low-gravity solidification of materials is a drop tube. A drop tube is ideally suited for investigations of supercooling and free fall solidification of high temperature refractory metals and alloys.

One such drop tube is located at NASA's Marshall Space Flight Center. This drop tube consists of a ten centimeter inside diameter, about one hundred fifty feet long, stainless steel tube. A bell jar is at the top and contains an apparatus that melts and releases the material. The tube and bell jar are vacuum tight and may be evacuated or back-filled with various gases during an experiment. A pyrometer and infrared detectors provide a thermal history of the melted sample as it drops and solidifies in the tube. Viewing and instrumentation ports are located on each floor. A sample is decelerated and caught by a detachable catcher at the bottom of the tube. This apparatus provides up to about 4.2 seconds of free fall time.

In regard to various levitation techniques, there are four basic levitation techniques. These techniques are electromagnetic levitation, electrostatic levitation, acoustic levitation, and aerodynamic levitation. This invention pertains to aerodynamic levitation. But, in order to provide a background for the invention, there follows a brief discussion about each of the previous three levitation techniques.

Electromagnetic levitation techniques only provide for the melting and levitation of electrically conductive materials in a containerless environment. Early research on this technique attempted to eliminate crucible contamination of samples and provide studies of reactive high melting point metals.

In this method, the levitating force and heating power are produced by the induction of eddy currents in a metallic sample by an alternating electromagnetic field. This technique may be used in a high vacuum environment. However, this technique requires the simultaneous melting and levitation of the material.

Electrostatic levitation techniques can levitate and manipulate materials in a high vacuum. An electrostatic levitator operates on the principal of a feedback controlled by electrostatic force. A CCD camera monitors the object's position and a minicomputer provides a real-time air signal that is used to adjust the main electrostatic force between the electrodes. A more detailed description of electrostatic levitation is found on pages 34–35 of the article by M. Barmatz entitled "Overview of Containerless Processing Technologies" published in *Materials Processing in the Reduced Gravity Environment of Space* by Elsevier Science Publishing Company, Inc., Guy E. Rindone, Editor (1982). This technique also simultaneously couples the levitation and melting functions.

Any material, whether it be a conductor or insulator, magnetic or non-magnetic, may be levitated by acoustic forces. Acoustic levitation techniques require a gas medium for the propagation of the sound waves.

Acoustic forces are associated with non-linear phenomena. Non-linear acoustic theory predicts that in high intensity standing wave sound fields, samples with densities which are large when compared to the surrounding gas will be positioned at acoustic pressure nodal positions which correspond to the minimum of the force potential well. A more detailed discussion of acoustic levitation techniques as found at pages 29 through 33 of the paper "Overview of Containerless Processing Technologies" by M. Barmatz.

Referring now to aerodynamic levitation, one of the earliest works in the atmospheric sciences which used aerodynamic levitation was that of Blanchard, (Blanchard, C., "The Super-Cooling, Freezing and Melting of Giant Water Drops At Terminal Velocity and Air", *Proceedings of the First Conference on the Physics of Cloud and Precipitation Particles*, Woods Hole, Massachusetts, pages 233–247, Sep. 7–10, 1955). In this research, the levitation of liquid droplets was achieved in a square wind tunnel which discharged to the environment. According to the article, this tunnel arrangement was able to levitate samples, which were unrestrained in the horizontal plane, for many minutes. The primary purpose of this apparatus was to observe the melting and freezing of water drops.

A number of attempts by other researchers have been less than fully successful in the aerodynamic levitation of liquid droplets. Several efforts, notably by Nordine and Atkins (Nordine, P. C. and Atkins, R. M., "Aerodynamic Levitation of Laser-Heated Solid and Gas Jets", *Review of Scientific Instruments*, 53 (9), pages 1456–1464, Sep., 1982) and Coutures et al. (Coutures, J. P., Rifflet, J. C., Billard, D. and Coutures, P., "Contactless Treatments of Liquids In a Large Temperature Range By An Aerodynamic Levitation Device and Laser Heating", *Sixth European Symposium on Material Sciences Under Microgravity Conditions*, Dec., 2, 1986) have attempted to use single or multiple jets for levitation. As long as solid spheres are used, jet levitation can be effective. See Krispin, F., Williamson, J. W., Strauss, A. M., "Jet Levitation of Spherical Shapes for Microgravity Research", 38th Congress of the International Astronautical Federation.

On the other hand, past attempts to use jets for liquid levitation have not met with complete success. Others have attempted to levitate liquid aluminum droplets and solid uranium samples. Winborne, D. A., Nordine, P. C., Rosner, D. E., and Marley, H. F., "Aerodynamic Levitation Technique For Containerless High Temperature Studies in Liquid and Solid Samples", *Metallurgical Transactions B*, Volume 73, pages 711–713, Dec., 1976. In an effort to utilize jet levitation, Rush et al. developed a constricted-tube air levitator. However, stable melting of the samples was not achieved. Rush, J. E., Stephens, W. K., and Ethridge, K. C., "Properties of a Constricted-Tube Air Flow Levitator", *Materials Processing In The Reduced Gravity Environment Of Space*, pages 131–138, Edited by Guy Rindone, Elsevier Science Publishing Company, New York, N.Y. 1982. In 1982 Ethridge et al. reported the results of a collimated holed structure gas jet levitator used to levitate hollow glass microballoons. Ethridge, E. C. and Dunn, S. L., "Air Jet Levitation Furnace System For Observing Glass Microspheres During Heating and Melting", *Materials Processing In The Reduced Gravity Environment Of Space*, pages 121–130, Edited by Guy Rindone, Elsevier Science publishing Company, New York, N.Y. 1982. Nordine and Atkins have also done work in jet levitation as reported in 1982. Nordine, P. C. and Atkins, R. M., "Aerodynamic Levitation of Laser-Heated Solids and Gas Jets", *Review of Scientific Instruments*, 53 (9), pages 1456–1464, Sep., 1982.

Thus, in view of the importance of containerless processing through levitation techniques, there is a need to develop both an improved apparatus and a method for aerodynamic levitation.

In view of the difficulty associated with the levitation of liquid drops, there is a special need to provide an improved apparatus and method for the containerless processing of liquid drops.

It is further important to provide an improved apparatus and method for the levitation of liquid drops that does not possess an inherent characteristic to melt the material.

There is a need to use aerodynamic levitation in the area of aerodynamic interactions between gas flows and liquid drops. There is a further need to use aerodynamic levitation in the area of mass transfer reactions. There is a need to use aerodynamic levitation in the areas of droplet coalescence and droplet deformation.

SUMMARY OF THE INVENTION

It is a principal object of this invention to provide an improved apparatus and method for the aerodynamic levitation of an object.

It is another object of this invention to provide an improved apparatus and method for the aerodynamic levitation of a liquid drop.

In one form thereof, the invention is an apparatus for the levitation of a liquid drop by a fluid flow. The apparatus comprises a profile generator. A fluid flow supply means, which is operative with the profile generator, supplies a flow of fluid to the profile generator.

The profile generator comprises an elongate cylindrical shell which has opposite ends and a central longitudinal axis. The shell defines at one end thereof an entrance through which the fluid flow enters the shell.

The shell further defines at the other end thereof an exit through which the fluid flow exits the shell.

A profiling means, contained within the elongate shell, configures the velocity profile of the fluid flow entering the shell so as to present a predetermined velocity profile upon exiting the profile generator.

In another form thereof, the invention is a profile generator comprising an elongate shell which has opposite ends. The shell defines at one end thereof an entrance through which fluid enters the profile generator and at the other end thereof defines an exit through which fluid exits the profile generator. A profiling means, contained within the elongate shell, configures the velocity profile of the fluid entering the profile generator so as to present a predetermined velocity profile upon exiting the profile generator.

In still another form thereof, the invention is a method for levitating a liquid drop comprising the following steps: providing a profile generator, supplying an air flow to the profile generator, configuring the velocity profile of the air flow to a pre-selected velocity profile upon the exit from the profile generator, and impinging the liquid drop with the air flow having the pre-selected velocity profile.

BRIEF DESCRIPTION OF THE DRAWINGS

The following is a brief description of the drawings which form a part of this patent application.

DETAILED DESCRIPTION OF SPECIFIC EMBODIMENTS

FIG. 1 and FIGS. 2A, 2B, and 2C illustrate certain difficulties associated with the aerodynamic levitation of liquid drops. In order to successfully levitate a liquid drop, one must maintain a stable, vertical position of the drop. For a given drop size, density of material and density of gas flow, there must be a specific velocity capable of supporting the drop.

Figure 1:
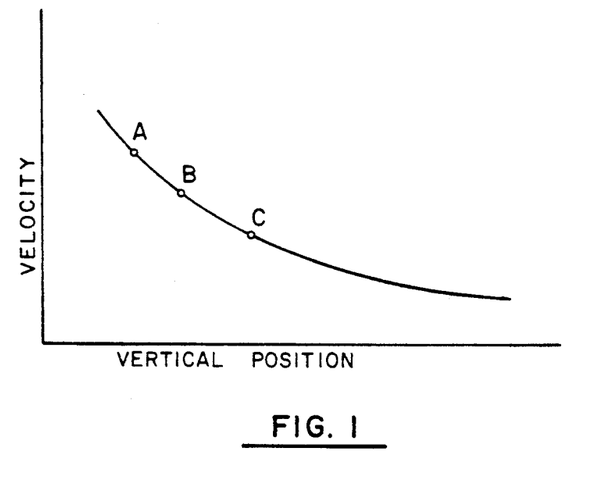
FIG. 1 is a graph representing conditions for vertical stability in a levitation of a liquid drop.

FIG. 1 illustrates the fact that axial position may be maintained only if the centerline velocity decreases with an increase in axial position. Referring to FIG. 1, a liquid drop displaced from a position of equilibrium toward either position "A" or "C" (as illustrated in FIG. 1) will encounter an unbalanced force which tends to restore the drop to the position identified as "B" on FIG. 1. When the above condition, i.e. the restoration of the liquid drop to equilibrium after being displaced from equilibrium, a semblance of vertical stability for the liquid drop should be the result.

Figure 2A:
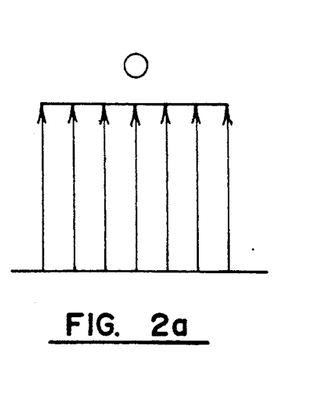
FIGS. 2A, 2B, and 2C illustrate conditions for radial stability by illustrating three different velocity profiles.
Figure 2B:
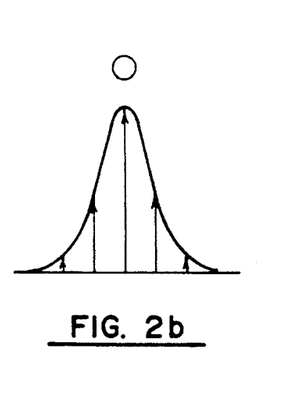
Figure 2C:
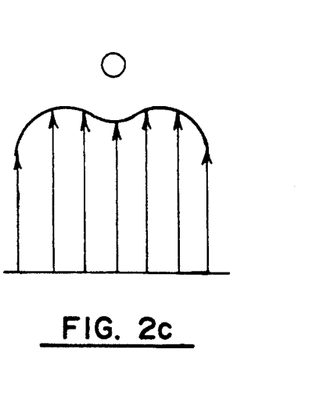

FIGS. 2A, 2B, and 2C represent possible velocity profiles and facilitate the explanation of the impact the velocity profile has upon the radial stability of the liquid drop.

FIG. 2A represents a flat velocity profile in the transverse direction. Assuming that the drag force offsets the gravity force, this velocity profile depicts a situation of neutral stability, at best. The liquid drop has no preferred position in the radial direction. This velocity profile is unacceptable for the stable aerodynamic levitation of a liquid drop.

FIG. 2B illustrates the velocity profile of a jet configuration. Again, the liquid droplet may find an equilibrium position in the vertical direction, but in this case, the droplet will not maintain axial symmetry. Once the droplet is asymmetrical, it will become unstable and will simply be ejected to the side. Such a velocity profile is unacceptable for the stable aerodynamic levitation of a liquid drop.

FIG. 2C is an acceptable velocity profile for the aerodynamic levitation of a liquid drop. The axial velocity is high enough on the axis to produce a balance of forces between aerodynamic drag and the gravitational force. In this instance, translational motion of the drop from the centerline position produces an asymmetric droplet shape which tends to be restored to the centerline position.

This effect is complex due to the asymmetry of the drop and the consequent asymmetry force patterns acting on the drop. One simplified explanation of this is that two radial forces are thought to exist due to two different effects.

First, there may be a positive radial force acting in the positive R-direction for a drop already displaced in this direction. This force is a direct consequence of the velocity gradient at this location. Referring to FIG. 2C, however, it illustrates a velocity profile which must change as the flow progresses in the vertical direction. That is to say that there must be a radial velocity component within the flow which occurs in the negative radial direction. This velocity component provides a radial force component which tends to maintain droplet alignment along the centerline.

Velocity profiles which are necessary for aerodynamic levitation need to possess the following qualities: be vertically oriented, be symmetrical about the central longitudinal axis, be as tranquil as possible, have a minimum velocity on the centerline, and exhibit a centerline velocity which decreases in the direction of flow.

Figure 3:
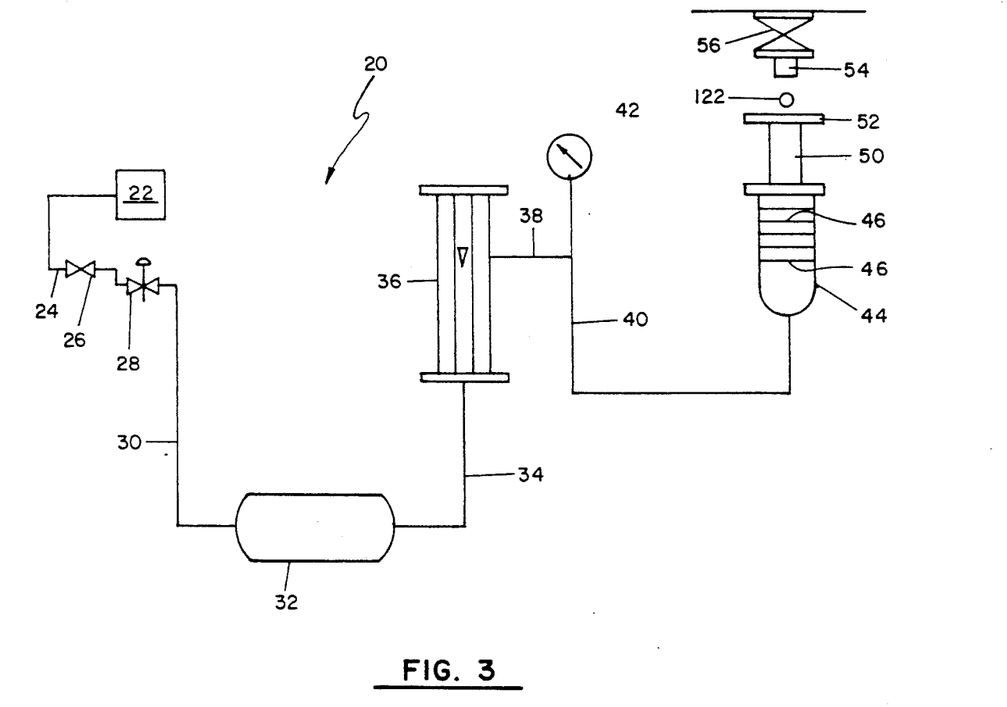
FIG. 3 is a mechanical schematic diagram of a specific embodiment of the levitation apparatus of the invention.

Referring to FIG. 3, there is illustrated a mechanical schematic view of a specific embodiment of the present invention. The apparatus for levitation is generally designated as 20.

The levitation apparatus 20 includes a source of plant air 22. Air source 22 connects via conduit 24 to a valve 26. Valve 26 connects to a Speedaire Model 4Z027 regulator 28. The regulator 28 regulates the air pressure to between about 70 psi and about 80 psi. Air regulator 28 connects via conduit 30 to Belier Wheel Brake and Supply SAE Code—AR10 settling tank 32. Settling tank 32 connects via conduit 34 to a Brooks Type 2-1231-1110 Full View Rotameter 36.

The Brooks rotameter 36 connects via conduit 38 and conduit 40 to a pressure gauge 42 and a flow reservoir 44. The flow reservoir contains five screens 46 to help produce a uniform, steady flow. These screens 46 are spaced along the central axis of the flow reservoir 44. The screens 46 are oriented so as to be generally perpendicular to the axis of fluid flow.

Flow reservoir 44 connects and is in communication with profile generator 50 through a smooth, convergent nozzle (not illustrated). A plexiglass flange 52 radially projects from the top edge of the profile generator 50.

The levitation apparatus 20 further includes a back pressure plate 54 which is operatively connected to a mechanical jack 56 so as to adjust the position of the back pressure plate 54 relative to the fluid flow.

Figure 4A:
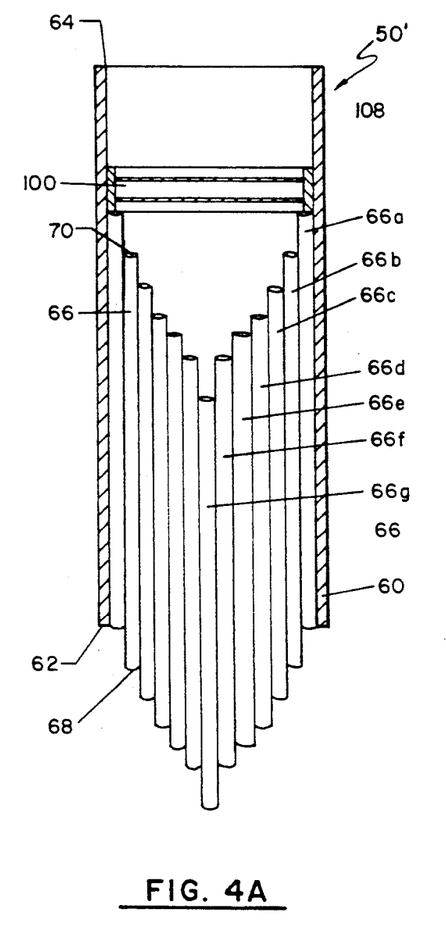
FIG. 4A is a side sectional view of a first specific embodiment of the profile generator as used in conjunction with the levitation apparatus of FIG. 3.
Figure 4B:
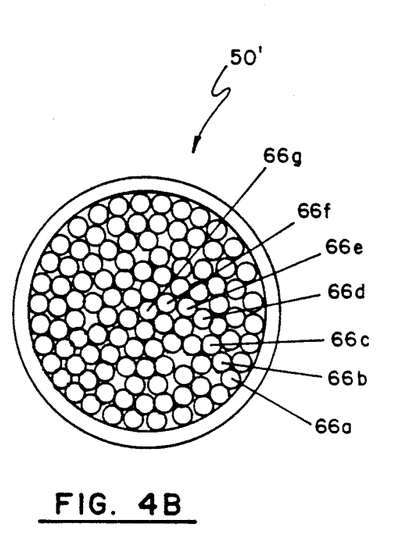
FIG. 4B is a bottom view of the profile generator of FIG. 4A.
Figure 5:
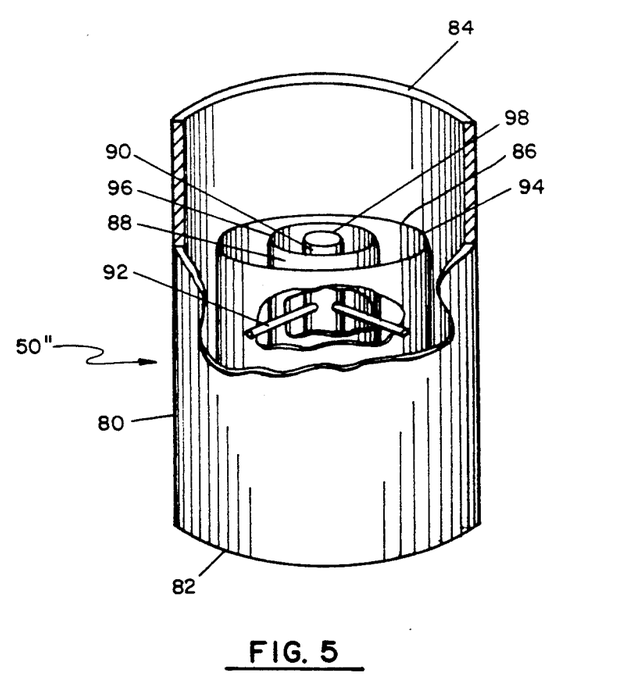
FIG. 5 is a perspective view of a second specific embodiment of the profile generator used in conjunction with the levitation apparatus of FIG. 3 with a part of the shell cut away.

The profile generator 50 can take on the form of either one of two specific embodiments as illustrated in FIGS. 4A and 4B, and FIG. 5.

Referring to the specific profile generator 50' illustrated in FIG. 4A and 4B, which is the preferred profile generator, profile generator 50' includes a cylindrical shell 60. Shell 60 is made of plexiglass.

Shell 60 has an inside diameter of 4.430 cm and is 15.2 cm in length. Shell 60 includes opposite ends 62 and 64. Shell 60 defines adjacent end 62 an entrance through which a fluid flow enters the profile generator 50'. Shell 60 defines an exit at end 64 through which fluid flow exits profile generator 50'.

A plurality of elongate tubes (or hollow straws) 66 are contained within shell 60. Each tube 66 has opposite ends 68 and 70. Tube 66 defines an entrance adjacent one end 68 and defines an exit adjacent the other end 70.

As illustrated by FIGS. 4A and 4B, the central longitudinal axes of each one of tubes 66 is generally parallel to the central longitudinal axis of shell 60.

Although FIGS. 4A and 4B do not illustrate as many tubes 66, in the preferred specific embodiment, there are one hundred thirty tubes 66. Each tube 66 has an outside diameter of 3.4 mm and a wall thickness of 0.20 mm. Each tube 66 is of a length of 15.2 cm, which equals the length of shell 60.

The tubes 66 are oriented with shell 60 so as to present seven concentric stepped rings of tubes 66. The orientation of these tubes is in a stairstep configuration. The steps descend radially inwardly from the shell 60. This orientation is illustrated by FIGS. 4A and 4B which show the seven rings of tubes 66a, 66b, 66c, 66d, 66e, 66f and 66g.

The center tube 66g is a single tube.

A screen assembly is positioned above (or downstream of) the tube configuration. The structure of the screen assembly is described in more detail hereinafter.

Referring to FIG. 5, there is illustrated a second specific embodiment of the profile generator 50''. Profile generator 50'' includes an elongate cylindrical shell 80 having opposite ends 82 and 84. Shell 80 defines an entrance at end 82 and an exit at end 84. This shell 80 is made of plexiglass. Shell 80 has an inside diameter of 4.430 cm and a length of 15.2 cm.

In the drawings, there is illustrated a trio of concentric tubes 86, 88, 90 which are contained within shell 80 by pins 92, having a diameter of 1.8 mm, mounted radially through the concentric tubes (86, 88, 90) and the shell 80.

The radially outside concentric tube 86 includes one end 94 and an opposite end (not illustrated). Tube 86 has a wall thickness of 0.64 mm.

Tube 88 includes one opposite end 96 and another opposite end (not illustrated). Tube 88 has a wall thickness of 0.38 mm and a longitudinal length of 15.2 cm.

The center tube 90 also includes an opposite end 98 and another end (not illustrated). Tube 90 has a wall thickness of 0.38 mm and a longitudinal length of 15.2 cm.

Figure 6:
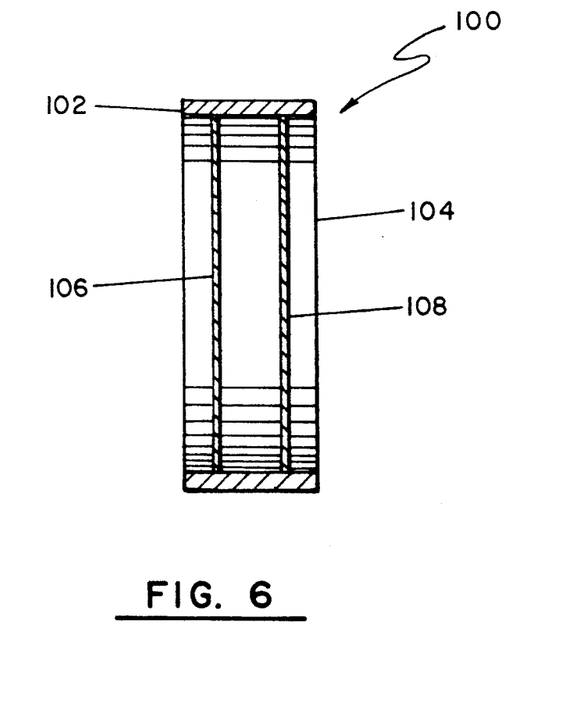
FIG. 6 is a side sectional view of one specific embodiment of the screen assembly for use with the profile generator.
Figure 7:
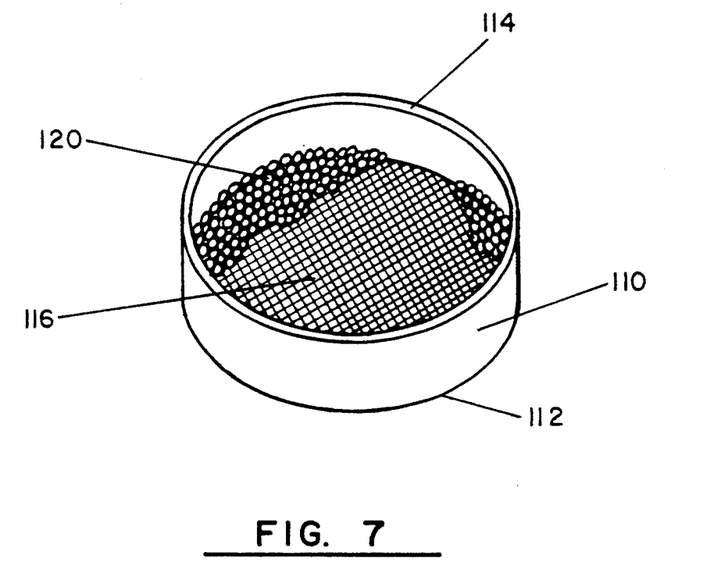
FIG. 7 is a perspective view of a second specific embodiment of the screen assembly for use with the profile generator.

Although not illustrated, it should be understood that a screen assembly is positioned within the shell 80 so as to be directly above the concentric tubes. Referring to FIGS. 6 and 7, there are illustrated two specific embodiments of the screen assembly.

In regard to the first specific embodiment as illustrated in FIG. 6, the screen assembly includes a circular wall 100 having opposite ends 102 and 104. A pair of screens 106 and 108 are disposed within the volume defined by the circular wall 100. Screens 106, 108 are generally perpendicular to the central axis of the fluid flow. Each screen 106, 108 is a twenty mesh screen with a wire diameter of 0.33 mm.

Referring to FIG. 7, it is contemplated that the screen assembly could take on another form. The second specific embodiment of the screen assembly comprises a cylindrical wall 110 having opposite ends 112 and 114. A fine mesh screen 116 is affixed to the wall 110 at one end 112 thereof. A plurality of small ball bearings 120 are positioned on top of the screen 116. These ball bearings 120 are maintained within the volume of the screen assembly by the cylindrical wall 110 and the screen 116. It is expected that this structure would reduce turbulence in the air flow exiting the profile generator.

The liquid drop that is levitated is illustrated as 122 in FIG. 3.

In operation, it is desirable to achieve a velocity profile that has the general configuration like that illustrated in FIG. 2C. In this regard, it is important that the centerline velocity decrease in the direction of the fluid flow. If this is not the case, the velocity along the centerline will gradually increase and the drop will accelerate along the centerline and eventually be ejected from the fluid flow.

The back pressure plate 54 helps maintain the velocity profile so that the centerline velocity decreases in the direction of the fluid flow. As illustrated in FIG. 3, the back pressure plate 54 is generally perpendicular to the central axis of fluid flow. The back pressure plate 54 is an impediment to the flow of fluid exiting the profile generator.

As the fluid flow moves closer to the back pressure plate 54, its velocity begins to decrease. This decrease is a decrease in the centerline velocity of the fluid flow. The degree of decrease is dependent upon the distance of the back pressure plate 54 from the exit of the profile generator 50. Thus, it can be seen that by adjusting the distance between the back pressure plate 54 and the exit of the profile generator 50 by the mechanical jack 56, one can adjust or impact upon the velocity at the centerline.

An adjustment in the velocity at the centerline configures the velocity profile. The centerline velocity must maintain a minimum velocity in order to keep the liquid drop in a levitated condition. This minimum velocity depends upon the specific material of the drop, the pressure in the system and other factors known to those skilled in this art.

Experimental Results

Certain experiments were conducted using the preferred specific embodiment. A brief description of this experiment is described below.

The apparatus used begins with a constant air supply up to about 70 psi delivered through Speedaire model 4Z027 regulator with 150 psig max pressure. This flow is directed to a Belier Wheel, Brake and Supply SAE code—A.R. 10 holding tank.

The next stage is a Brooks, type 2-1231-1110, serial No. 6409-70508 Full View Rotameter, and a Speedaire, model 1Z885B regulator with 250 psig max pressure. The flow proceeds into a settling chamber equipped with several screens and a nozzle to flatten and straighten the flow. This flat profile is then directed into the 1.75" dia., plexiglass tube containing the 12.5 cm long straw honeycomb, flow converter. The velocity profile exiting the straws is sent through a wire mesh screen, exits the tube, flows across the sample and up to the back pressure plate.

Velocity profiles were measured with a calibrated, single channel TSI 1010 hotwire anemometer. Centerline velocities required to levitate water droplets in the size range from 2 mm to 8 mm in diameter are on the order of 8 to 10 m/s.

Figure 8:
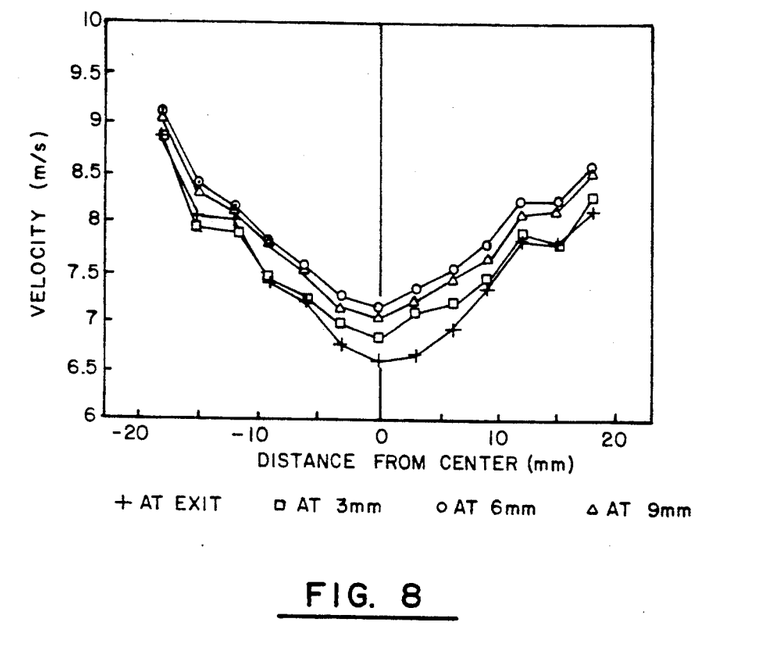
FIG. 8 is a graph showing the measured velocity profile as a function of the distance from the centerline.

FIG. 8 is a typical axial, velocity profile in the exit plane of the velocity shaper. It is fairly symmetrical with a velocity minimum at the centerline. This is a satisfactory velocity profile.

Figure 9:
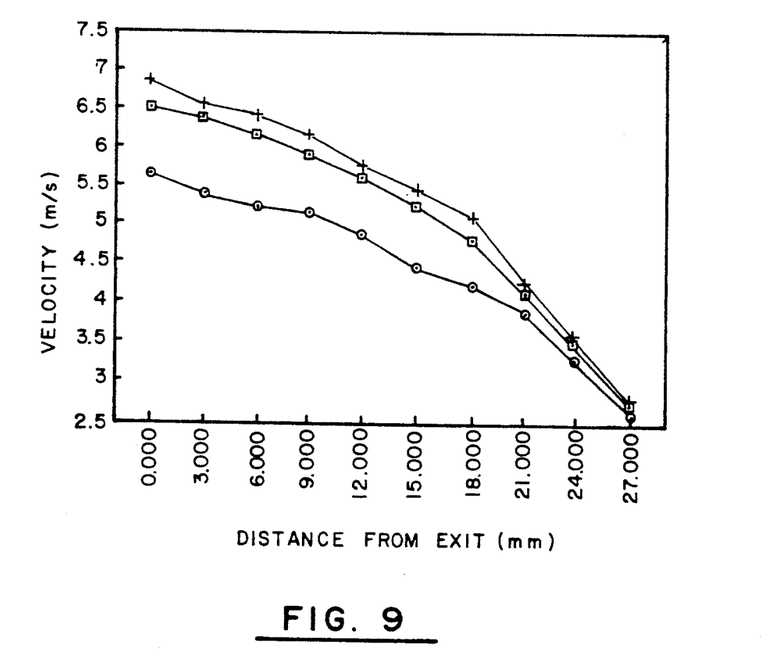
FIG. 9 is a graph showing the velocity profile downstream from the profile generator.

FIG. 9 illustrates the centerline velocity measured above the exit, and it is a consequence of the back pressure plate. Three curves are shown within FIG. 9 which differ as a consequence of supply pressure. For curve A, the supply pressue was 30 psi. For curve B, the supply pressure was 35 psi. For curve C, the supply pressure was 40 psi.

As stated before, the centerline velocity should be decreasing if close vertical positioning of the drop is to be realized. A constant centerline velocity will produce a case of neutral stability, and a profile which exhibits a small, negative velocity gradient will result in positioning characterized by rather large motions in the axial direction.

Large droplets have been observed as they evaporate with the passage of time. Observations for periods in excess of twenty minutes have been made. During this period, the geometry of the deformed droplet returns to a spherical shape as the size decreases. Once the droplet size is about 1.5 mm in diameter, the drop becomes unstable, but this instability may be a result of the experimentally produced turbulent flow conditions which exist throughout the working section.

While the above description describes specific embodiments of the invention, Applicants do not intend to be limited thereby. The scope of the invention is defined by the claims which are appended hereto and follow hereafter.

What is claimed is:

1. An apparatus for the levitation of a liquid drop by a fluid flow, the apparatus comprising:

a profile generator;

a fluid flow supply means, operative with the profile generator, for supplying a flow of fluid to the profile generator;

said profile generator comprising:

an elongate cylindrical shell having opposite ends and a central longitudinal axis, said shell defining at one end thereof an entrance through which the fluid flow enters the shell and at other end thereof an exit through which the fluid flow exits the shell; and a profiling means, within the elongate shell, for configuring the velocity profile of the fluid flow entering the shell so as to present a predetermined velocity profile upon exiting the profile generator wherein said profiling means includes at least one distinct elongate tube having a central longitudinal axis and being contained within said shell, said tube being positioned within said shell so that said central longitudinal axis of said tube is generally parallel to the central longitudinal axis of said shell.

2. The apparatus of claim 1 wherein the fluid flow supply means includes a fluid supply upstream of the profile generator.

3. The apparatus of claim 2 wherein the fluid flow supply means further includes a valve immediately downstream from the fluid supply, a regulator immediately downstream from the valve, and a settling tank immediately downstream from the regulator.

4. The apparatus of claim 3 wherein the fluid flow supply means further includes a rotameter immediately downstream from the settling tank, a pressure gauge immediately downstream from the settling tank, and a flow reservoir immediately downstream from the pressure gauge.

5. The apparatus of claim 4 wherein the flow reservoir communicates directly with the entrance of the shell.

6. The apparatus of claim 1 wherein the profile generator comprises at least one elongate tube within the shell.

7. The apparatus of claim 1 wherein the profile generator includes a screen assembly downstream of the profiling means.

8. The apparatus of claim 7 wherein the screen assembly comprises a plurality of aligned screens.

9. The apparatus of claim 1 wherein the fluid is a gas.

10. The apparatus of claim 9 where the gas is air.

11. The apparatus of claim 1 wherein the velocity profile exiting the profile generator has a centerline velocity that decreases in the direction of the fluid flow.

12. A profile generator comprising:

an elongate shell having opposite ends, said shell defining at one end thereof an entrance through which fluid enters the profile generator and at the other end thereof an exit through which fluid exits the profile generator; and a profiling means, within the elongate shell, for configuring the velocity profile of the fluid entering the profile generator so as to present a predetermined velocity profile upon exiting the profile generator wherein the velocity profile exiting the profile generator has a centerline velocity that decreases in the direction of the fluid flow.

13. The profiling generator of claim 12 further including a screen downstream of the profiling means.

14. A method for levitating a liquid drop comprising the steps of:

providing a profile generator;

supplying a fluid flow to the profile generator;

configuring the velocity profile of the fluid flow to a pre-selected velocity profile upon the exit from the profile generator wherein the velocity profile exiting the profile generator has a centering velocity that decreases in the direction of the fluid flow; and impinging the liquid drop with the fluid flow having the pre-selected velocity profile.

15. An apparatus for the levitation of a liquid drop by a fluid flow, the apparatus comprising:
   a profile generator;
   a fluid flow supply means, operative with the profile generator, for supplying a flow of fluid to the profile generator;
   said profile generator comprising:
   an elongate cylindrical shell having opposite ends and a central longitudinal axis, said shell defining at one end thereof an entrance through which the fluid flow enters the shell and at other end thereof an exit through which the fluid flow exits the shell;
   a profiling means, within the elongate shell, for configuring the velocity profile of the fluid flow entering the shell so as to present a predetermined velocity profile upon exiting the profile generator; and
   a back pressure plate assembly comprising:
   a back pressure plate; and
   a jack for positioning the back pressure plate.

16. An apparatus for the levitation of a liquid drop by a fluid flow, the apparatus comprising:
   a profile generator;
   a fluid flow supply means, operative with the profile generator, for supplying a flow of fluid to the profile generator;
   said profile generator comprising:
   an elongate cylindrical shell having opposite ends and a central longitudinal axis, said shell defining at one end thereof an entrance through which the fluid flow enters the shell and at other end thereof an exit through which the fluid flow exits the shell; and
   a profiling means, within the elongate shell, for configuring the velocity profile of the fluid flow entering the shell so as to present a predetermined velocity profile upon exiting the profile generator, the profiling means including:
   a plurality of elongate tubes contained within the shell, each of the tubes having a central longitudinal axis, the tubes being positioned within the shell so that the axes of the tubes are generally parallel to the axis of the shell.

17. The apparatus of claim 16 wherein some of the elongate tubes are of the same length.

18. A profile generator comprising:
   an elongate shell having opposite ends, said shell defining at one end thereof an entrance through which fluid enters the profile generator and at the other end thereof an exit through which fluid exits the profile generator;
   a profiling means, within the elongate shell, for configuring the velocity profile of the fluid entering the profile generator so as to present a predetermined velocity profile upon exiting the profile generator;
   the shell is cylindrical and has a central longitudinal axis; and
   the profiling means includes a plurality of elongate pipes each having a central longitudinal axis, and said pipes positioned within the shell so that the axis of the tube and the axes of the pipes are generally parallel.

19. The profiling generator of claim 18 wherein some of the pipes are of equal lengths.

20. A profile generator comprising:
   an elongate shell having opposite ends, said shell defining at one end thereof an entrance through which fluid enters the profile generator and at the other end thereof an exit through which fluid exits the profile generator;
   a profiling means, within the elongate shell, for configuring the velocity profile of the fluid entering the profile generator so as to present a predetermined velocity profile upon exiting the profile generator; and
   the profiling means includes a plurality of concentric tubes.

21. A method for levitating a liquid drop comprising the steps of:
   providing a profile generator;
   supplying a fluid flow to the profile generator;
   configuring the velocity profile of the fluid flow to a preselected velocity profile upon the exit from the profile generator;
   impinging the liquid drop with the fluid flow having the preselected velocity profile; and
   providing a back pressure plate to impinge the fluid flow after passing the liquid drop.

22. The method of claim 21 further including the step of adjusting the distance between the back pressure plate and the profile generator.

* * * * *